United States Patent [19]

Roth

[11] 4,043,575
[45] Aug. 23, 1977

[54] RISER CONNECTOR

[75] Inventor: Albert B. Roth, Lafayette, Calif.

[73] Assignee: The Rucker Company, Oakland, Calif.

[21] Appl. No.: 628,531

[22] Filed: Nov. 3, 1975

[51] Int. Cl.$^2$ ............................................. F16L 39/00
[52] U.S. Cl. .................................. 285/90; 285/137 A; 285/377
[58] Field of Search ............... 285/137 A, 377, 362, 285/90, 91, 376, 360, 401

[56] References Cited

U.S. PATENT DOCUMENTS

| 8,096 | 5/1851 | Osgood | 285/377 |
|---|---|---|---|
| 939,434 | 11/1909 | McVoy | 285/377 X |
| 1,097,508 | 5/1914 | Bailey | 285/362 X |
| 1,238,218 | 8/1917 | Thompson et al. | 285/377 X |
| 1,734,996 | 11/1929 | Butler | 285/377 X |
| 1,778,739 | 10/1930 | Wheaton | 285/362 X |
| 2,550,027 | 4/1951 | Thompson | 285/137 A |
| 2,889,158 | 6/1959 | Hughes-Caley | 285/362 X |
| 3,198,555 | 8/1965 | Johnson et al. | 285/362 X |
| 3,310,107 | 3/1967 | Yancey | 285/137 A X |

Primary Examiner—Thomas F. Callaghan
Attorney, Agent, or Firm—Lothrop & West

[57] ABSTRACT

A connector for use between two riser pipes has a pin fitting at the end of one pipe. An end sleeve on the pin fitting has a cylindrical exterior surface and a first peripheral flange with upper and lower normal surfaces. A box fitting is at the end of the other pipe and has an end box with a cylindrical inner surface engaging the cylindrical exterior surface of the pin fitting. A second peripheral flange on the box fitting has upper and lower normal surfaces and is adapted to abut the first flange. An annular nut is rotatable about the flanges and has interior threads engageable with exterior threads on a collar rotatable around the box fitting and abutting the second flange. An inturned, interrupted nut flange on the nut overlies the first flange, which is also interrupted. The nut flange and the first flange can be relatively rotated to pass each other axially or to prevent such axial movement. The nut and collar can be held in any of several relatively rotated positions by a bolt and slot connection, and the collar is held by a bolt against turning on the box fitting. Both fittings carry support rings for auxiliary pipes.

4 Claims, 5 Drawing Figures

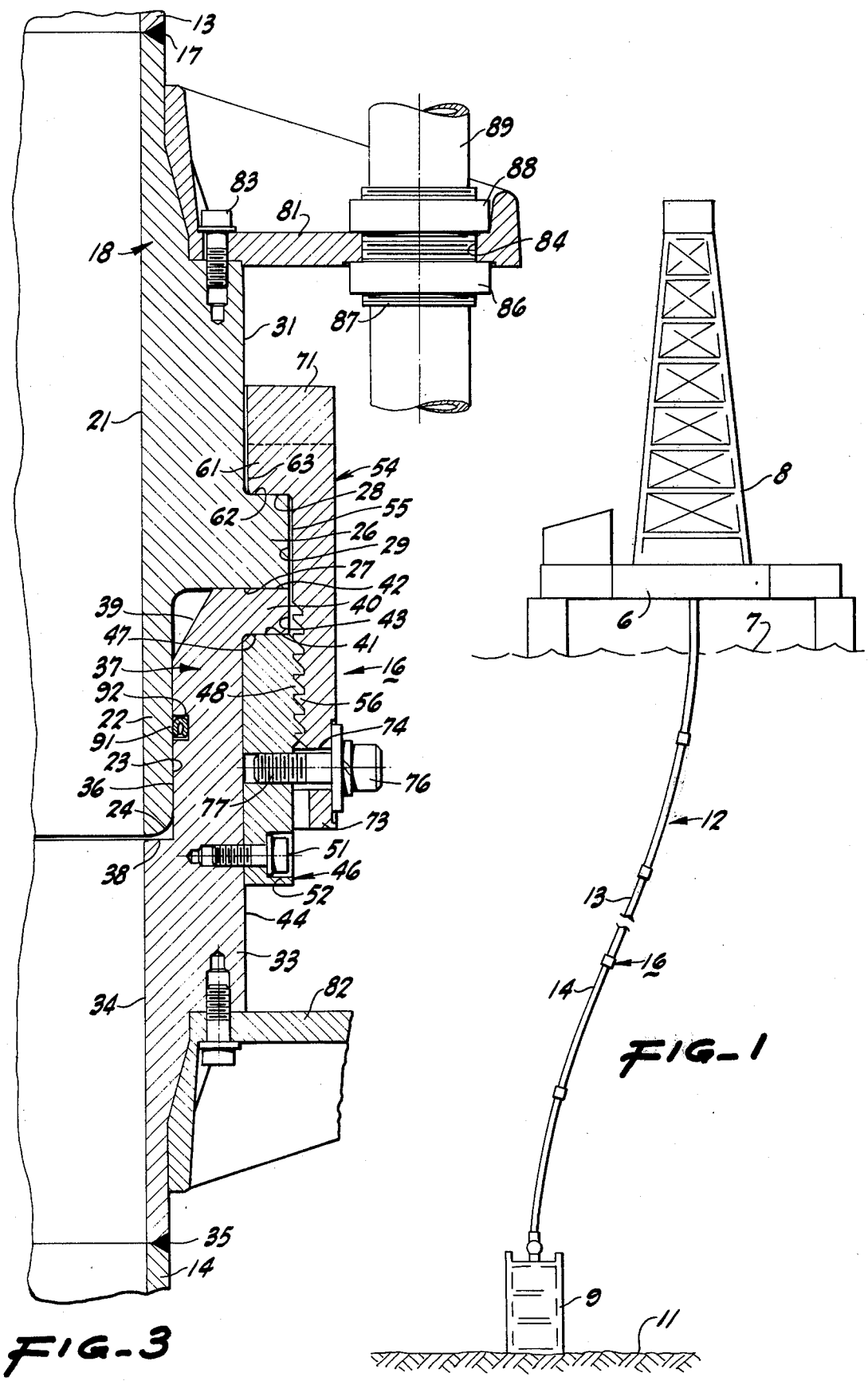

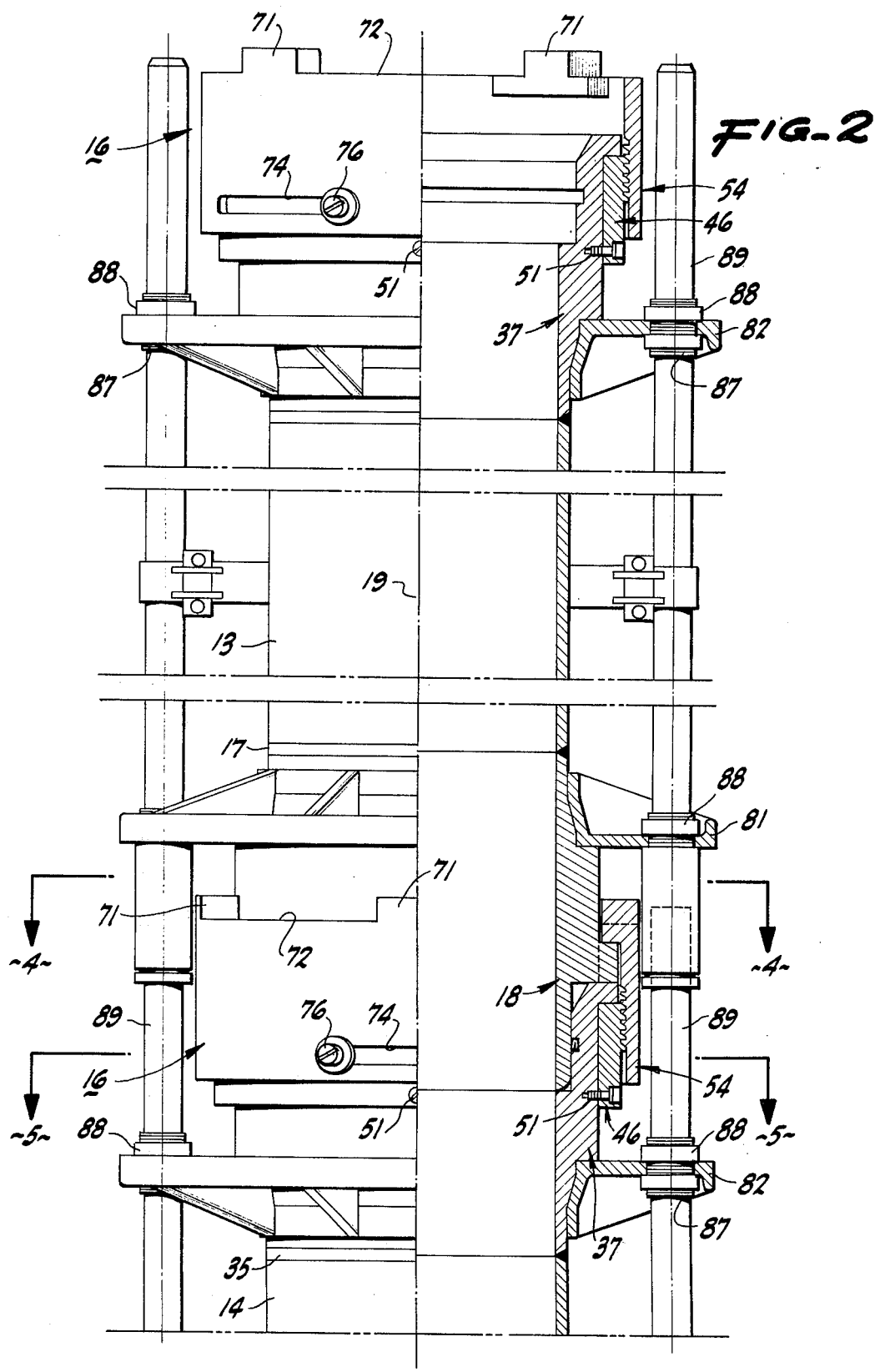

RISER CONNECTOR

In the drilling of oil wells, particularly underwater wells, sometimes referred to as "offshore" drilling, there is provided a drilling platform sometimes on a barge or boat disposed generally above a well frame situated at the ocean bottom. The drilling equipment on the drilling platform is connected to the submerged well frame by at least a riser pipe made up of a number of pipe sections connected end to end. There is often a number of additional pipes extending between the drilling platform and the well frame. While the drilling platform is maintained as nearly as possible in a fixed position above the well frame, there is always some variation in their relationship; that is, a lateral and vertical shifting between the two locations. The riser pipe takes care of various lateral motions by flexing while vertical motion is usually taken care of by a slip joint or motion compensator or both. Since the riser pipe is made up of various individual sections, the connections between the sections are required to withstand whatever flexing and moving forces occur in the riser pipe without in any way permitting any leakage or disconnection at the individual joints. Even so, such joints must be readily disconnected when the riser pipe is to be disassembled and must be quickly put together when the riser pipe is to be assembled.

It is therefore an object of my invention to provide a riser connector which is quite useful with successive riser pipe sections going to make up a riser pipe particularly for undersea drilling.

Another object of the invention is to provide a riser connector that is easily assembled and disassembled but when assembled is quite firmly held against not only the customary riser pipe forces, but particularly against the lateral or whipping forces that are encountered in undersea work.

Another object of the invention is to provide a riser connection that is easily assembled and disassembled by the workmen usually available on a drilling rig.

A further object of the invention is to provide a riser connector that can be assembled and disassembled with only ordinary oil field tools.

A further object of the invention is to provide a riser connector that is relatively inexpensive to construct and maintain in view of the rigorous service it must meet.

A further object of the invention is to provide a riser connector effective to prevent leakage by using metal to metal face seals.

A further object of the invention is in general to provide an improved riser connector for service in very great water depths.

Other objects, together with the foregoing, are attained in the embodiment of the invention described in the accompanying description and illustrated in the accompanying drawings, in which:

FIG. 1 is a schematic view generally in section on a vertical plane showing a typical offshore drilling arrangement and showing in side elevation a drilling platform above a well frame on the ocean bottom and connected thereto by a riser pipe;

FIG. 2, on the left half, is a side elevation of a section of riser showing a number of riser connectors thereon, and, on the right half, is a cross-section on a vertical axial plane through the same section of riser, certain portions of the structure being omitted to decrease the size of the figure;

FIG. 3 is an axial cross-section of a portion of the structure shown in FIG. 2 drawn to a substantially enlarged scale;

Figure 4:
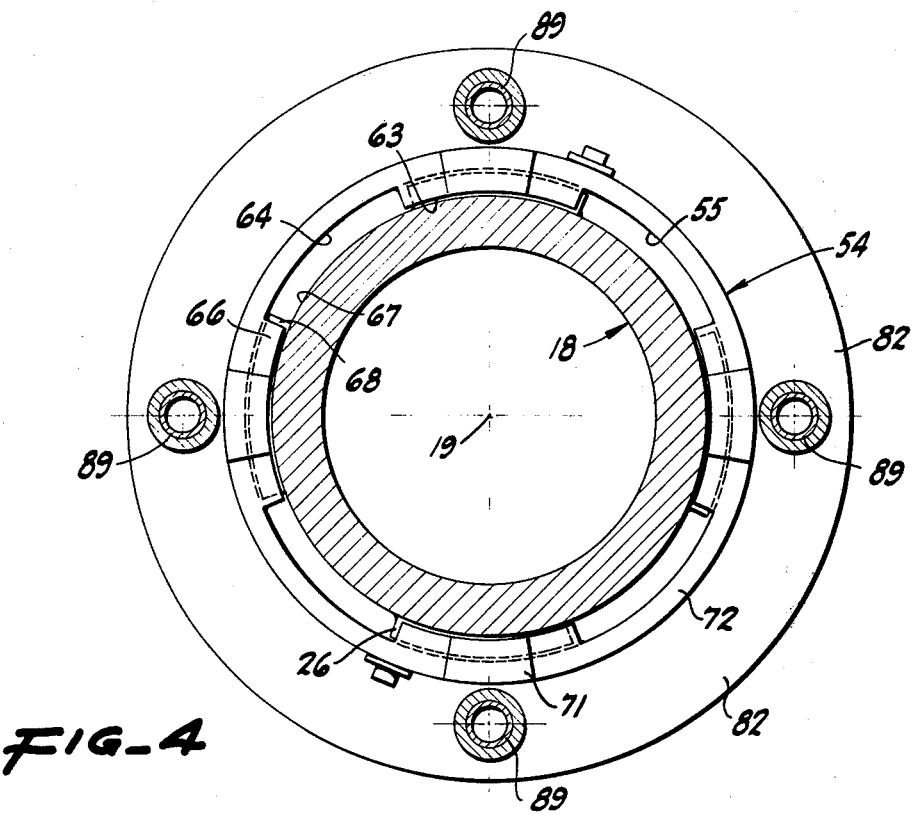
FIG. 4 is a cross-section, the plane of which is indicated by the line 4—4 of FIG. 2.
Figure 5:
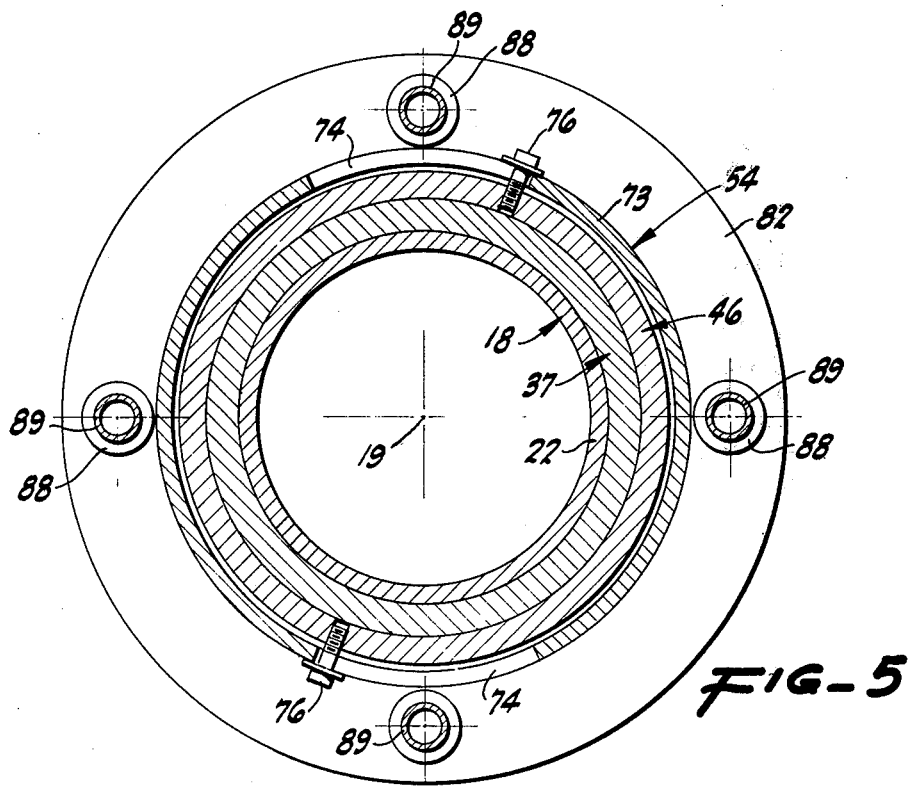
FIG. 5 is a cross-section, the plane of which is indicated by the line 5—5 of FIG. 2.

In a representative environment, as shown in FIG. 1, a drilling platform 6 at the surface 7 of the ocean is disposed with its well drilling equipment 8 above, but not necessarily directly over, a well frame 9 on the ocean bottom 11. The drilling platform can move, at least horizontally, relative to the well frame 9, but within a limited area. Interconnecting the drilling platform and the well frame is a riser 12 made up of a number of pipe sections, such as 13 and 14. Each section is an individual length of pipe, and the pipe sections are secured together by appropriate riser connectors 16.

As particularly shown to a large scale in FIG. 3, one of the upper pipes 13 is connected as by a line of welding 17 to a pin fitting 18 forming the upper portion of a connector 16. The pipe 13 and upper fitting 18 are generally symmetrical about an axis 19 which is approximately vertical and runs for the length of the riser The pin fitting 18 is a generally annular body coaxial with the axis 19 and has an inner bore surface 21 extending the inner surface of the pipe 13. At its lower end, the pin fitting has a depending end sleeve 22 externally bounded by a circular-cylindrical outer surface 23, as well as by a somewhat rounded end surface 24. The surface 23 is concentric with the axis 19, whereas much of the surface 24 is normal thereto.

The end sleeve merges smoothly with a first peripheral flange 26 having a lower pin flange surface 27 generally normal to the axis 19 and having also an upper pin flange surface 28 likewise normal to the axis. The exterior of the first flange is bounded by a concentric circular-cylindrical surface 29, and much of the remainder of the fitting is bounded by a circular-cylindrical surface 31.

Adapted axially to continue the pin fitting 18 is a box fitting 33. This includes a body having a generally circular-cylindrical interior surface 34 concentric with the axis 19 and continuing the interior surface of a pipe section 14 secured to the box section by a line of welding 35. The box fitting internally has an end box 37 including an offset shoulder 38 generally normal to the axis and extending between the interior surface 34 and a circular-cylindrical interior box surface 36, likewise coaxial. The surface 36 extends upwardly to a conical section 39 on the interior of a second peripheral box flange 40 outstanding from the box fitting body. The flange 40 is defined by a lower flange surface 41 normal to the axis, by an upper box flange surface 42 likewise normal to the axis, and peripherally by a surface 43 substantially continuing the surface 29. The arrangement is such that the surfaces 23 and 36 are adapted substantially to telescope or abut. The surfaces 27 and 42 abut when the parts are assembled. Most of the remainder of the box fitting has an exterior circular-cylindrical surface 44.

Against the surface 44 and rotatable thereon about the axis 19 is a heat treated, annular collar 46. This is defined in part by an upper end surface 47 normal to the axis and adapted to abut the flange surface 41. The collar has external threads 48 shaped to resist axial tension loads. The collar is freely rotatably on the box fitting body unless such rotation is restrained by a fastening bolt 51 seated in a socket 52 in the collar and having threads to engage threads in the body of the box fitting 33.

Cooperating with the collar is a nut 54 of annular configuration having a circular-cylindrical clearance surface 55 continued by interior threads 56 cooperating or interengaging with the threads 48 to move the nut axial with respect to the collar. Extending radially inwardly from the upper end of the nut is an inturned nut flange 61 having a lower surface 62 adapted to overlie and abut the surface 28 and having an inner boundary 63 spaced a short distance away from the surface 31. The upper end of the nut, as shown particularly in FIG. 4, has a number of cut-out portions 64 leaving intervening portions 66 of the flange 61. The cut-out portions are slightly longer in peripheral extent than are the intervening portions 66. In a similar fashion, the flange 26 has cut-out portions 67 that are about the same in peripheral extent as are the resulting intervening portions 68 or lugs. The size of the cut-out portions 67 is sufficient to pass the intervening portions 66 in an axial direction. In effect, the nut 54 has a bayonet or breech block relationship with the pin fitting 18.

The upper portion of the nut flange 61 is castellated or formed with raised lugs 71 and intervening, depressed valleys 72. The lower portion of the nut has a depending skirt 73 pierced by a peripherally elongated slot 74 of adequate size both circumferentially and axially to clear a fastening bolt 76 passing through the slot and having threads 77 engaging the collar 46.

Both of the fittings 18 and 33 are arranged to carry supporting rings 81 and 82. These are substantially identical, but are assembled inverted order. Each of the rings is seated on a cone and is secured in position by removable fastenings 83. Each support ring extends outwardly from its fitting and carries one or more openings 84 to pass a securing assembly 86, inclusive of a threaded sleeve 87 and a pair of jam nuts 88 for holding in position an auxiliary pipe 89, such as a choke line or a kill line or the like, extending between the drilling platform and the well frame.

In the operation of this structure and before the auxiliary lines 89 are positioned, the pin fitting and the box fitting are disposed substantially in axial alignment with each other. The collar 46 is preassembled on the box fitting 33, but the fastening bolt 51 is not yet installed. The nut 54 is rotated onto the collar (temporarily held from turning) until the threads 48 and 56 are almost fully engaged with each other and so that the axial distance between the surfaces 42 and 62 is just a little more than sufficient to receive the flanges 26 and 40 or, preferably, a gage block of the same axial dimension as the flange 26 and the flange 40. The fastening bolt 76 is then engaged with the collar 46, while the bolt 76 is disposed in the "loose" end of the slot 74. So much of the assembly is rotated on the box fitting 33 until the cut-out portions 64 on the nut 54 are in axial alignment with the interrupted flange 26 on the pin fitting 18 and with the openings 84 in the supporting ring 82 in proper rotated position.

If rotary adjustment is needed, the collar 46 and the nut 54 are bodily rotated as a unit. This does not change their relative axial position. When the collar and nut rotated position is correct for the desired axial alignment, the fastening bolt 51 is installed through the socket 52 into a hole drilled and tapped at assembly at a proper location in the box fitting 33. The collar 46 is thus permanently fixed. The flange 26, or gage block, is then axially withdrawn and the device is ready for use.

With axial and rotary alignment established, the pin fitting and the box fitting are advanced axially toward each other, the lugs 68 passing through the cut-out portions 64 and the end sleeve 22 entering into the box fitting in the vicinity of the conical portion. The end of the pin fitting is guided by the conical portion until both fittings are exactly coaxial, whereupon further relative advancing movement of the fittings causes the sleeve to ride over a packing 91 installed in a groove 92 in the box fitting. The parts continue their approaching movement until the upper surface 42 of the box fitting is abutted by the lower surface 27 of the pin fitting, forming a metal to metal seal. The fittings are then fully approached or "stabbed".

The fastening bolt 76 if moderately tight is loosened slightly and the nut 54 is rotated in a tightening direction. A sledge or pneumatic hammer against a drift on one of the raised lugs 71 or a spanner engaging two of the lugs 71 is used to rotate the nut on the held collar 46 until the surfaces 27 and 42 are in non-leaking abutment and the assembly is under the required stress. The slot 74 during such tightening moves its "loose" end away from the bolt 76. The "tight" end of the slot approaches more or less but does not reach the bolt 76, which is then tightened to hold the nut 54 in tight poition.

In this way, the assembly is secured in its fully assembled or locked condition. The reverse sequence of events permits the disassembly of the pin fitting from the box fitting.

When the fittings are assembled and tightened and secured, the supporting rings 81 are supplied with the auxiliary lines 89, such as the kill line and the choke line, by passing sections thereof through the various fittings or threaded sleeves 87 and then securing them in position by tightening the jam nuts 88. The arrangement is such that a readily assembled and disassembled riser connector is provided. The assembly of the parts can be accomplished without any precision maneuvering, but the parts are held in precise axial location. They are secured together firmly by rather rough tools, but are locked in their final location in an easy fashion. Disassembly is easily accomplished by loosening the fastening bolt 76 and sledging or wrenching the nut 54 loose until the bayonet connection allows axial lug movement apart. The auxiliary lines 89 are disconnected and the two fittings are axially separated.

What is claimed is:

1. A riser connector for use between first and second pipe sections comprising a pin fitting adapted to be secured to the end of said first pipe section, said pin fitting including an end sleeve having a circular-cylindrical exterior surface, and said pin fitting including an outwardly projecting first peripheral flange having a planar first lower pin surface and a planar first upper pin surface, said first peripheral flange also having exterior peripheral cut-out portions leaving first intervening portions, a box fitting adapted to be secured to the end of said second pipe section, said box fitting including an end box having a circular-cylindrical interior surface adapted to telescope with said circular-cylindrical exterior surface, and said box fitting including an outwardly projecting second peripheral flange having a planar second lower box surface and a planar second upper box surface adapted directly to contact said first lower pin surface, and annular nut rotatable about said first and second peripheral flanges and having interior threads facing said box fitting, an inturned flange on said nut having an inwardly projecting planar lower nut surface adapted to contact said first upper pin surface, said inturned flange also having interior cut-out portions of an extent to pass said first intervening portions and leaving second intervening portions of said inturned flange of an extent to pass through said peripheral cut-out portions, an annular collar extending around and rotatable on said box fitting, said collar including a planar end surface adapted to abut said second lower box surface and also including exterior threads adapted to interengage said interior threads on said annular nut, and means engaging said collar and said box fitting in a predetermined relative rotated position thereof for preventing rotation of said collar on said box fitting.

2. A device as in claim 1 in which said means for preventing rotation of said collar with respect to said box fitting is a bolt.

3. A device as in claim 1 in which said first intervening portions on said first peripheral flange are substantially of the same peripheral extent as said second intervening portions on said inturned flange and are in substantial axial registry with said second intervening portions when said collar and said box fitting are in said predetermined position.

4. A riser connector for use between first and second pipe sections comprising a pin fitting substantially symmetrical about an axis and adapted to be secured to the end of said first pipe section, said pin fitting including an end sleeve having a circular-cylindrical exterior surface concentric with said axis, and said pin fitting including a first peripheral flange having a first lower pin surface normal to said axis and a first upper pin surface normal to said axis, said first peripheral flange also having peripheral cut-out portions leaving first intervening portions, a box fitting substantially symmetrical about said axis and adapted to be secured to the end of said second pipe section, said box fitting including an end box having a circular-cylindrical interior surface concentric with said axis and adapted to telescope with said circular-cylindrical exterior surface, and said box fitting including a second peripheral flange having a second lower box surface normal to said axis and a second upper box surface normal to said axis and adapted to abut said first lower pin surface, an annular nut having an interior surface and rotatable about said axis and having interior threads extending said interior surface, an inturned flange on said nut having a lower nut surface normal to said axis and adapted to abut said first upper pin surface, said inturned flange also having interior cut-out portions of an extent to pass in an axial direction said first intervening portions and leaving portions of said inturned flange of an extent to pass in an axial direction through said peripheral cut-out portions, an annular collar rotatable about said axis and including an end surface normal to said axis and adapted to abut said first lower box surface and also including exterior threads adapted to interengage said interior threads, means for optionally locking said collar and said nut against more than limited relative rotation about said axis, and means for securing said collar in a predetermined rotated position on said box fitting.

* * * * *